United States Patent [19]

Economy et al.

[11] Patent Number: 5,051,313

[45] Date of Patent: Sep. 24, 1991

[54] HOT ROLL FUSERS COMPRISING POLYARYLENE ELASTOMERS

[75] Inventors: James Economy; James L. Hedrick, Jr., both of San Jose; Jeffrey W. Labadie, Campbell, all of Calif.

[73] Assignee: Lexmark International, Inc., Greenwich, Conn.

[21] Appl. No.: 561,494

[22] Filed: Jul. 31, 1990

Related U.S. Application Data

[63] Continuation of Ser. No. 302,501, Jan. 26, 1989, abandoned.

[51] Int. Cl.$^5$ .......................... B32B 7/00; B32B 9/04; B32B 27/00
[52] U.S. Cl. .................................. 428/500; 428/119; 428/411.1; 428/473.5
[58] Field of Search ................ 428/119, 473.5, 500, 428/411.1

[56] References Cited

U.S. PATENT DOCUMENTS

| | | |
|---|---|---|
| 3,736,293 | 5/1973 | Novak .................................. 260/61 |
| 4,108,837 | 8/1978 | Johnson et al. ..................... 528/126 |
| 4,232,142 | 11/1980 | Barr et al. ........................... 528/125 |
| 4,247,682 | 1/1981 | Dahl .................................... 528/176 |
| 4,465,646 | 8/1984 | Evans et al. .......................... 264/24 |

*Primary Examiner*—John Kight, III
*Assistant Examiner*—T. Mosley
*Attorney, Agent, or Firm*—John A. Brady

[57] ABSTRACT

Hot roll fusers are made with a matrix resin which is an elastomer having a glass transition between 90° C. and 160° C. and a structure represented by the formula X-(-Ar—Y-)-Ar—X wherein Ar is an aromatic ring structure, Y is O, S, C=O, SO$_2$, C(CH$_3$)$_2$, C(CF$_3$)$_2$, CH$_2$ or (CF$_2$)$_n$ and X is —O—C≡N, —C≡CH or

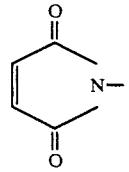

3 Claims, No Drawings

HOT ROLL FUSERS COMPRISING POLYARYLENE ELASTOMERS

This is a continuation of Ser. No. 07/302,501 filed Jan. 26, 1989, now abandoned.

TECHNICAL FIELD

The present invention is concerned with hot roll fusers which are used, for example, in photocopiers and photoprinters. In particular, it is concerned with certain polyarylene elastomers to be used as matrix resins in such fusers.

BACKGROUND ART

U.S. Pat. Nos. 3,736,293 and 4,232,142 show structures different from, but having some similarity to, the elastomers used in the present invention, but the patents are entirely silent about hot roll fusers.

Polydimethylsiloxanes and related structures have commonly been used as matrix resins for filled fuser rollers. Unfortunately, the thermal oxidative stability of these materials is somewhat limited, leading to crosslinking and hardening of the otherwise soft fuser roll. This leads to inadequate fusing of the toner on the paper as well as formation of a wear track in changing between 11 and 14" wide paper. Traditionally, this has been the most costly aspect of maintenance of both photocopiers and printers.

Alternative matrix resins for these composite coatings have primarily consisted of perfluoroalkyl ethers. Although these are attractive thermally stable elastomers, they have many drawbacks including processability, expense, adhesion, filling, conductivity and others which limit their utility as fuser roller materials.

DISCLOSURE OF THE INVENTION

We have recently taken a completely new approach in the design of thermally stable elastomers for use in fuser rolls. Wholly aromatic poly(arylene ethers) and related structures have been synthesized with Tg's well below the use temperature (170°–185° C) of the fuser roller. When these materials are lightly crosslinked, they exhibit excellent elastomeric qualities, thermal oxidative stability and resistance to wicking oils.

According to the present invention, a hot roll fuser comprises an elastomer having a glass transition temperature between 60° C. and 160° C. and a structure represented by the formula X+Ar—Y+Ar—X wherein Ar is an aromatic ring structure, Y is O, S, C=O, SO$_2$, C(CH$_3$)$_2$, C(CF$_3$)$_2$, C H$_2$ or (CF$_2$)$_n$ and X is —O— C≡N, —C≡CH or

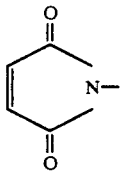

It is an unexpected feature of the present invention that these rigid aromatic structures become rubbery, rather than leathery, above their glass transition temperatures (Tg).

Poly(arylene ethers, ether sulfones and ether ketones) are thermally stable structures which exhibit Tg's between 90° and over 300° C. The judicious choice of the monomers and/or a combination of both para and meta isomers affords an amorphous-wholly aromatic materials with a low Tg (less than 140° C.). A wide variety of interconnecting units between the aromatic rings are possible to optimize Tg, flexibility and thermal stability.

One series of materials are poly(arylene ether ketones) composed of both meta and para linkages affording amorphous materials. Hydroquinone was reacted with various compositions of both 2,4'- and 4,4'-difluorobenzophenone using the NMP/K$_2$CO$_3$ synthetic route. Long reaction times (24h) were required to afford high molecular weight owing to steric effect associated with the 2-4' isomer. Table 1 contains the thermal properties of the polymers synthesized. The mixture of isomers affords amorphous materials with polymers composed of 75 mole % and greater of the meta isomer. Low Tg's (≧145° C.) were also observed for these structures. In addition, excellent thermal stability was observed for these structures with the onset of degradation occurring at approximately 600° C.

TABLE 1

| Mole % 2,4-difluorobenzophenone | Tg °C. | Tm °C. |
|---|---|---|
| 0 | 145 | 345 |
| 15 | 145 | 300 |
| 25 | 145 | — |
| 50 | 150 | — |
| 75 | 131 | — |
| 100 | 145 | — |

Another series of poly(arylene ether ketones), I, were synthesized which contained fluorine to better control surface effects and also provide improved thermal stability.

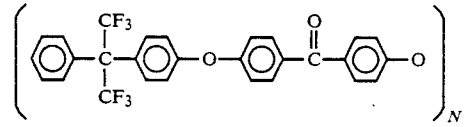

Both high molecular weight and functional oligomers were synthesized as shown in Table 2. The Tg's range from 150° to 175° C. depending on the molecular weight. Phenolic hydroxyl terminated oligomers were synthesized to provide the necessary end group chemistry for crosslinking into network structures.

TABLE 2

| Characteristics of Bis-F based Poly(arylene ethers ketones) | | | |
|---|---|---|---|
| Sample # | <Mn> g/mol | [2] dl/g | Tg °C. |
| 1 | 5,000 | 0.13 | 155 |
| 2 | 12,000 | 0.22 | 170 |
| 3 | 20,000 | 0.50 | 175 |

Another synthetic approach involves the preparation of poly(arylene ethers) which do not contain sulfone or ketone moieties. The Ullman reaction was used to prepare structures with Tg's in the 90°–120° C. range. Several structures have been synthesized in moderate molecular weight which have Tg's between 115° and 120° C.

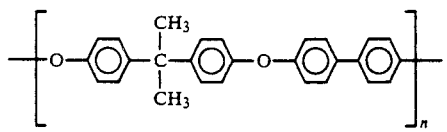

Network formation can be achieved by a number of methods by preparing functionally terminated oligomers which crosslink with temperature and/or catalyst. These reactive groups include biphenylene, cyanato, cyano, epoxy, ethynyl, maleimide, nadimide, propargyl, vinyl, benzocyclobutene and others.

It should be obvious to one skilled in the art that the behavior of these new more thermally stable fuser elastomers can be further modified with appropriate fillers to further enhance properties such as thermal conductivity, wear resistance, stability to wicking oils, etc. Although one would anticipate use of wicking oils to facilitate interactions between the paper and the roll it is felt that one could also fill those elastomers with appropriate wicking fluids which would bleed very slowly to the surface and thus eliminate the need for adding such fluids to the surface. Finally and perhaps most importantly, availability of fuser rolls with greatly improved thermal stability permits use of higher fusing temperatures, permitting use of a much broader range of low cost toners which today cannot be used because they fuse at much higher temperatures.

We claim:

1. A hot roll fuser having a coating on its surface, said coating having a matrix which is an elastomer having a glass transition between 60° C. and 160° C. and a structure represented by the formula X—(Ar—Y—)—Ar—X wherein Ar is an aromatic ring structure, Y is O, S, C=O, SO$_2$, C(CH$_3$)$_2$, C(CF$_3$)$_2$, CH$_2$ or (CF$_2$)$_n$ and X is —O—C≡N, —C≡CH or

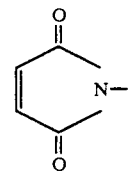

2. A hot roll fuser as claimed in claim 1 wherein the elastomer has a Tg below 150° C.

3. A hot roll fuser as claimed in claim 1 wherein the elastomer is fluorinated.

* * * * *